United States Patent [19]

Murase et al.

[11] 4,312,902

[45] Jan. 26, 1982

[54] COATING COMPOSITION CAPABLE OF FORMING A MULTILAYER FILM

[75] Inventors: Heihachi Murase; Tutomu Yamamoto, both of Hiratsuka, Japan

[73] Assignee: Kansai Paint Co., Ltd., Japan

[21] Appl. No.: 125,234

[22] Filed: Feb. 27, 1980

[30] Foreign Application Priority Data

Mar. 7, 1979 [JP] Japan .................................. 54-25637

[51] Int. Cl.³ .............................................. B05D 3/02
[52] U.S. Cl. .................................... 427/386; 138/145; 138/146; 204/181 T; 260/18 PF; 260/31.2 N; 260/31.2 MR; 260/32.8 A; 260/32.8 EP; 260/33.2 EP; 260/33.6 EP; 260/33.8 EP; 427/27; 427/28; 427/236; 427/239; 427/388.2; 427/388.5
[58] Field of Search ............ 427/202, 181, 410, 388.5, 427/386, 27, 195, 435, 421, 428, 234, 236, 239, 28, 388.2; 260/33.6 R, 33.6 EP, 33.6 PQ, 31.2 R, 31.2 MR, 31.2 N, 32.8 A, 32.8 EP, 33.8 EP, 18 PF; 204/181 T, 181 R; 428/416; 138/145, 146

[56] References Cited

U.S. PATENT DOCUMENTS

| Re. 30,006 | 5/1979 | Sakayori et al. | 427/202 X |
| 3,775,175 | 11/1973 | Merian | 427/388.5 X |
| 3,860,557 | 1/1975 | Millar et al. | 260/42.27 X |
| 4,012,270 | 3/1977 | Fitko | 427/410 X |

FOREIGN PATENT DOCUMENTS 487492  5/1969  Japan .
53-14577  5/1978  Japan .

Primary Examiner—Norman Morgenstern
Assistant Examiner—Thurman K. Page
Attorney, Agent, or Firm—Wenderoth, Lind & Ponack

[57] ABSTRACT

A coating composition capable of forming a multilayer coated film, said composition comprising
(a) a solid powder comprising an olefinic resin containing at least 76% by weight of a structural unit derived from an olefin and having a melt index of from 0.3 to 120 g/10 min.,
(b) a film-forming resin material containing an epoxy resin having a number average molecular weight of about 300 to about 4,000 and an epoxy equivalent of from 100 to 3,300, and
(c) a volatile organic liquid medium capable of wetting said powder (a) but substantially incapable of swelling and dissolving said solid powder (a).

16 Claims, 2 Drawing Figures

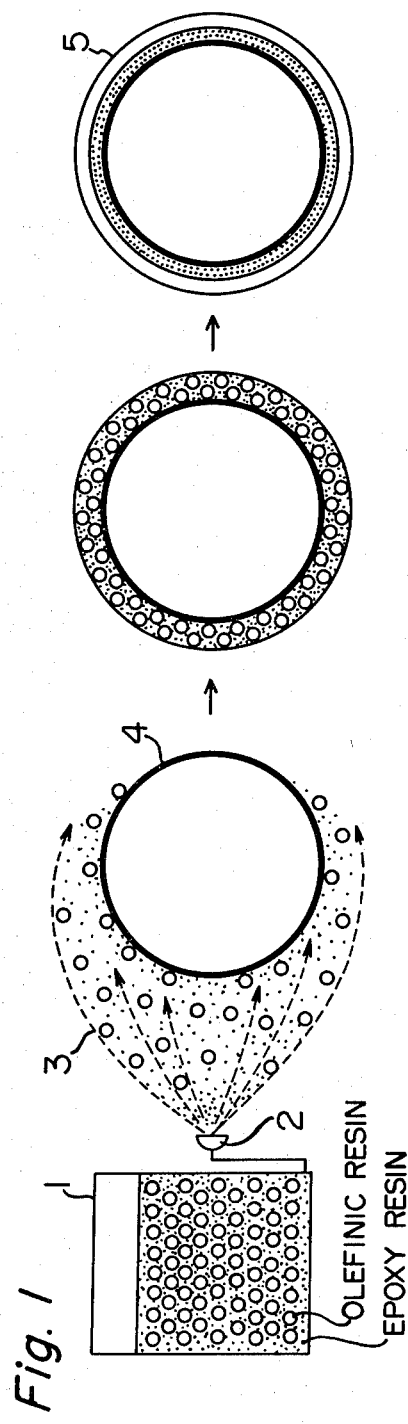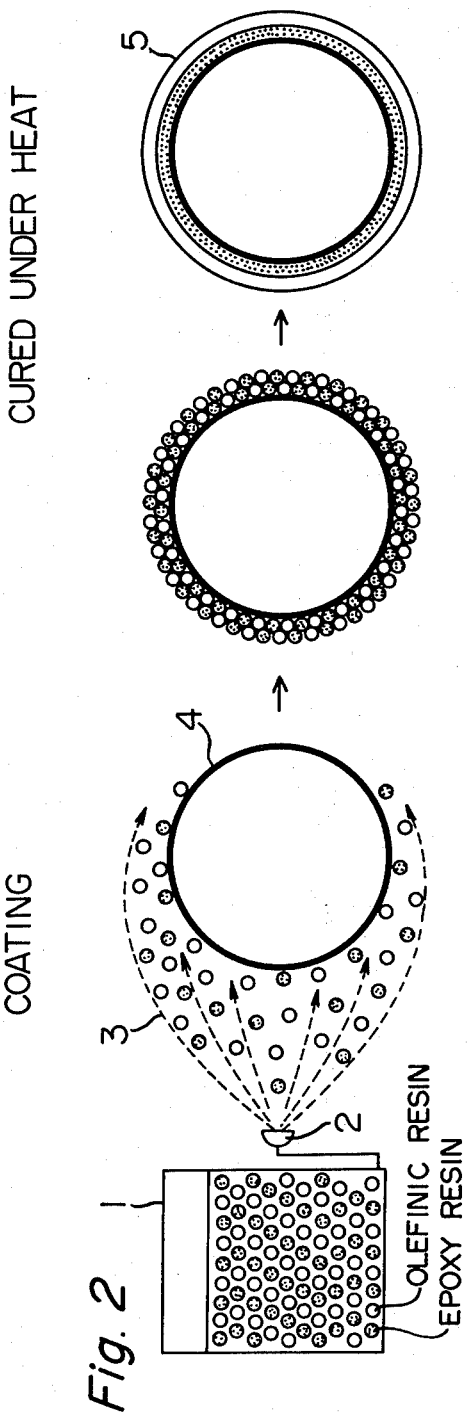

COATING COMPOSITION CAPABLE OF FORMING A MULTILAYER FILM

This invention relates to a coating composition capable of forming a multilayer film. More specifically, this invention relates to a slurry-like coating composition which comprises a mixture of a solid powder of an olefinic resin and a solid powder of an epoxy resin with a volatile organic liquid medium and which can afford, by a single coating operation, a multilayer coated film composed of an upper layer of the olefinic resin and a lower layer of the epoxy resin.

Water supply and drainage pipes, water tanks, etc. used in factories, business buildings, etc. have anti-corrosive coatings on their inner surfaces in order to prevent corrosion. These anti-corrosive coatings are required to be smooth and chemically inert so as to avoid a reduction in water quality owing to the dissolution of soluble components when they are used in contact with city water, or to prevent blockage owing to the adhesion or buildup of dirty matter, etc. when they are used in contact with sewage water. Coating agents containing polar polymers such as epoxy resins or polyesters as vehicles have superior rust-preventive properties and good adhesion to metal surfaces which constitute water supply and drainage pipes, water tanks, etc. Because of their high polarity, however, these polymers have high affinity for water and organic matter. This brings about the disadvantage that the constituent resin is diffused from the coated film to water to pollute the water or cause adhesion of the dirty matter in water to the inside surfaces of the pipes or tanks. Accordingly, these coating agents cannot find practical application.

Heretofore, polyolefins have been considered most suitable as coating agents because of their chemical inertness, low cost and ability to give smooth coated films, and various methods have been investigated for coating water supply and drainage pipes or water tanks with the polyolefins.

Polyolefins alone cannot give a feasible coated film on a metal surface because, as is well known, their adhesion to the metal surface is very poor. It was suggested therefore to use modified polyolefins obtained by introducing polar functional groups such as a hydroxyl or carboxyl group into the molecules of the polyolefins. These modified polyolefins have not proved entirely satisfactory in regard to adhesiveness and corrosion resistance.

Under these circumstances, a method considered heretofore to be most suitable for the coating of the inner surfaces of water supply and drainage pipes, water tanks, etc. involves applying a primer comprising a polymer having superior adhesiveness and corrosion resistance such as an epoxy resin to the inner surfaces of such pipes or tanks, curing the coated film by heating, and then applying a coating of a polyolefin, especially the aforesaid modified polyolefin having a polar functional group which poses little problem in regard to adhesion to the surface of the primer layer, to the surface of the primer layer. Clearly, however, the need for two coatings is operationally complicated and economically disadvantageous, and moreover, the adhesion between the coated films obtained by this method is insufficient. It has been strongly desired therefore to provide a coating material and/or a coating method which can satisfy the aforesaid properties simultaneously by a single coating operation.

It is a primary object of this invention to provide a coating composition capable of easily affording by a single coating operation and a single baking operation a multilayer coated film which at once has high corrosion resistance attributed to an epoxy resin and superior water resistance and superior resistance to water pollution attributed to an olefinic resin and which has very good delamination strength between the layers.

Another object of this invention is to provide a method for forming by a single coating operation and a single baking operation a multilayer coated film which is composed of a layer of epoxy resin and a layer of olefinic resin and therefore has high corrosion resistance attributed to the epoxy resin and superior water resistance and superior resistance to water pollution attributed to the olefinic resin and very high delamination strength between the layers.

Other objects and advantages of this invention will become apparent from the following description.

According to this invention, there is provided a coating composition capable of forming a multilayer coated film, said composition comprising (a) a solid powder comprising an olefinic resin containing at least 76% by weight of a structural unit derived from an olefin and having a melt index of from 0.3 to 120 g/10 min. [to be referred to as "solid powder (a)"], (b) a film-forming resin material containing an epoxy resin having a number average molecular weight of about 300 to about 4,000 and an epoxy equivalent of from 100 to 3,300 [to be referred to as "resin material (b)"], and (c) a volatile organic liquid medium capable of wetting said solid powder (a) but substantially incapable of swelling and dissolving said solid powder (a) [to be referred to as "liquid medium (c)"].

By utilizing the thermodynamic interaction between the olefinic resin and the epoxy resin and between the surface of a coating substrate and these resins, a coated film composed of two layers respectively of the two different resins can be obtained from the coating composition of this invention by a one coating operation. When the coating composition of this invention is coated on the surface of a metal substrate, the olefinic resin and the epoxy resin separate clearly as a surface layer and an under layer respectively and show the same state as that which may be obtained by separately coating the epoxy resin and the olefinic resin through two operations. Thus, by a single coating and baking process, there can be easily obtained a multilayer coated film in which a surface coating of the olefinic resin adheres very firmly to an under layer of the epoxy resin.

The multilayer coated film so formed exhibits simultaneously high corrosion resistance and strong adhesion to the substrate surface which are attributed to the cured epoxy resin layer, and high water resistance and high water pollution resistance which are attributed to the surface layer of the olefinic resin which is smooth and chemically inert. The coating composition of this invention, therefore, is suitable for coating the insides of various metal substrates, particularly water supply and drainage pipes and water tanks. Such a coating prevents corrosion of the metal substrates. In the case of water supply and drainage pipes of water tanks, the components of the coated film are prevented from being dissolved in city water and sewage water during passage or storage through or in the water supply and drainage pipes or water tanks. Also, the deposition of sewage sludge on such pipes can be effectively inhibited.

The coating composition of this invention is described below in more detail.

Solid powder (a)

The olefinic resin in the solid powder (a) includes homopolymers of olefins, copolymers of at least two olefins with each other, copolymers of at least one olefin with at least one copolymerizable vinyl monomer, modified products of these homopolymers or copolymers, and blends of these. The olefins include not only those containing only one ethylenic double bond (monoolefins) but also those containing two or more ethylenic double bonds (diolefins, etc.), and specific examples are ethylene, propylene, butene, isobutylene, pentene, butadiene, and isoprene.

Examples of the other vinyl monomer copolymerizable with olefins include aromatic vinyl compounds such as styrene, α-methylstyrene and vinyltoluene; vinyl esters of organic acids such as vinyl propionate; unsaturated carboxylic acids and the anhydrides or esters thereof, such as acrylic acid, methacrylic acid, methyl acrylate, ethyl acrylate, propyl acrylate, n-butyl acrylate, isobutyl acrylate, 2-ethylhexyl acrylate, methyl methacrylate, ethyl methacrylate, n-propyl methacrylate, isopropyl methacrylate, n-butyl methacrylate, 2-ethylhexyl methacrylate, maleic acid and maleic anhydride; and allyl vinyl ether, vinyl chloride and vinylidene chloride. The structural unit derived from such another vinyl monomer is present in the olefinic polymer in a total amount of up to 24%. In other words, it is important that the olefin unit should be present in an amount of at least 76% by weight, preferably at least 85% by weight, more preferably at least 90% by weight, in the polymer. If the amount of the olefin unit is less than 76% by weight, formation of a multiple coated film from the resulting coating composition tends to become difficult.

Examples of the modification products of the olefinic polymer or copolymers include graft copolymers of these with styrene, acrylic acid, acrylonitrile, acrylamide, etc.; their chlorosulfonated products; their halogenated products; their oxidized products; and their sulfonated products. It is also important that a unit derived from such a modified olefin resin should be present in an amount of at least 76% by weight, preferably at least 85% by weight, more preferably at least 90% by weight, in the solid powder (a), in order to form a multiple coated layer with certainty.

Typical examples of the olefinic resin used in this invention are low-density, medium-density or high-density polyethylene, polypropylene, an ethylene/propylene copolymer, an ethylene/vinyl acetate copolymer, an ethylene/acrylic acid copolymer, fluorinated polyethylene, chlorinated polyethylene, chlorosulfonated polyethylene, sulfonated polyethylene, polyethylene oxidized with ozone, styrene-grafted polyethylene, acrylic acid-grafted polyethylene, acrylonitrile-grafted polyethylene and acrylamide-grafted polyethylene. Low-density or medium-density polyethylene and ethylene/vinyl acetate copolymer are preferred. There is no particular restriction on the molecular weight of the olefinic resin if it is film-forming. Generally, however, the olefinic resin should desirably have a number average molecular weight of at least about 5,000, preferably at least about 20,000.

These olefinic resins can be used either singly or as a blend of two or more. For example, by using low-density polyethylene and high-density polyethylene together, the surface hardness or flexibility of the resulting coated film can be controlled. Or the formation of separate layers in the multilayer film can be equilibrated with the delamination strength between the layers by conjointly using polyethylene and modified polyethylene having a polar functional group.

When such a blend is used, it may contain at least 76% by weight, preferably at least 85% by weight, more preferably at least 90% by weight, based on the total weight of the blend, of an olefin unit.

It is important that the olfinic resin used in this invention should have a melt index of from 0.3 to 120 g/min., preferably from 1.5 to 80 g/10 min., more preferably from 4 to 70 g/10 min. If the melt index of the olefinic resin is less than 0.3 g/10 min., the melt flowability of the coated film at the time of coating the coating composition and baking it after drying is not sufficient, and it is difficult to obtain a smooth coated film. On the other hand, if the melt flow index of the olefinic resin exceeds 120 g/10 min., the melt flowability of the coating composition becomes excessively high, and it is difficult to form a multilayer coated film with certainty.

The solid powder (a) used in this invention may consist substantially only of the aforesaid olefinic resin. Powderization of the olefinic resin can be effected by methods known per se, for example by a method comprising impinging a solution of the olefinic resin into a nonsolvent for the resin, or a method comprising mechanically pulverizing the resin at extremely low temperatures.

The solid powder (a) may contain additives such as coloring agent (e.g., titanium oxide, carbon black, iron oxide, aluminum powder, phthalocyanine blue) or fillers (e.g., calcium carbonate, barium sulfate, talc, clay), in addition to the olefinic resin. These additives can be kneaded and dispersed in the olefinic resin prior to powderization, whereby the solid powder (a) can be colored or filled or its mechanical properties can be improved. The amount of such additives is not critical. Generally, however, it is desirably up to 150% by weight, preferably up to 120% by weight, based on the weight of the olefinic resin. If required, small amounts of flow controlling agents, thixotropic agents, etc. which are normally used may be incorporated in the solid powder (a).

The particle size of the solid powder (a) is not strictly limited, and can be varied over a wide range depending upon the type of the resin used in the solid powder (a), etc. Since too large a particle size may lead to a failure of giving a thin and smooth coated film, it is advantageous that the solid powder (a) has an average particle diameter of generally not more than 105 μm, preferably not more than 74 νm, more preferably not more than 44 μm.

Resin material (b)

The epoxy resin used in the resin material (b) is advantageously an epoxy resin which is solid or liquid at ordinary temperatures and has a number average molecular weight of about 300 to about 4,000, preferably about 500 to about 3,500, more preferably about 900 to about 2,900 and an epoxy equivalent of 100 to 3,300, preferably 450 to 2,400, more preferably 500 to 2,100.

The term "epoxy equivalent" of an epoxy resin, as used in the present specification and the appended claims, denotes the grams of the epoxy resin containing one gram-equivalent of epoxide.

If the number average molecular weight of the epoxy resin is less than about 300, the cohesive force between the epoxy resin molecules decreases remarkably, and a good multilayer coated film is difficult to obtain. On the other hand, if it exceeds about 4,000, the flowability of the molten coated film is insufficient so that a smooth coated film is difficult to obtain. Furthermore, if the epoxy equivalent of the epoxy resin used is less than 100, the crosslinking density of the cured film becomes excessively high, and the adhesion between the coated film and the substrate metal is likely to be reduced owing to the internal cohesive force. If, on the other hand, it exceeds 3,300, the crosslinking density becomes excessively low, and the resulting coated film has unsatisfactory water resistance.

The epoxy resin may be substantially insoluble, or soluble, in the liquid medium (c). When an epoxy resin insoluble in the liquid medium (c) is used, it can be introduced in the form of a solid powder into the coating composition.

Epoxy resins which can be used favorably in the present invention from the standpoint of the mechanical properties and corrosion resistance of the resulting cured coated film, the adhesion of it to the sunstrate metal, etc. include, for example, polyhydric phenol (e.g., bisphenol)/epihalohydrin condensate-type epoxy resins, phenol/formaldehyde condensate-type epoxy resins, and polymerized fatty acid-type epoxy resins. Examples of the polyhydric phenol/epihalohydrin condensate-type epoxy resins are condensation products between bisphenol A, bisphenol F, or halogenated bisphenol A and epichlorohydrin (e.g., Epikote 836, Epikote 1001, Epikote 1002, Epikote 1004, Epikote 1007, Epikote 1009, products by Shell Chemical Co.). Examples of the phenol/formaldehyde condensate-type epoxy resins include glycidyl ethers of novolac epoxy resins (e.g., Epikote 152, a product of Shell Chemical Co.). As the polymerized fatty acid-type epoxy resin, a dimeric acid-type epoxy resin (e.g., Epikote 872, a product of Shell Chemical Co.) may be used. The polyhydric phenol/epihalohydrin condensate-type epoxy resins are especially suitable for use in this invention. These epoxy resins can be used either singly or as a mixture of two or more.

As stated hereinabove, the epoxy resin may be soluble or insoluble in the liquid medium (c). When a soluble epoxy resin is used, it is easy to control the viscosity of the resulting coating composition. Furthermore, since the epoxy resin component in the coating composition is applied in the form of a solution to the surface of a substrate, its ability to wet the substrate surface is very good. Accordingly, a multilayer coated film having more improved corrosion resistance and adhesiveness can be provided, and the thickness of the resulting coated film can be made smaller.

The epoxy resin is used in combination with a curing agent for curing it. The curing agent may be incorporated in advance into the coating composition of this invention. Or it may be added just prior to the application of the coating composition of this invention. Epoxy curing agents that can be conveniently incorporated into the coating composition of this invention in advance are those which do not substantially react with the epoxy resin under the conditions of manufacturing and storing the coating composition of this invention but react rapidly with the epoxy resin under the conditions used in baking the coated film. Curing agents to be incorporated in the coating composition just prior to its coating are those which do not completely cure the epoxy resin before baking by rapidly reacting with it during mixing and/or coating.

Examples of curing agents that can be used conveniently in this invention include polycarboxylic acids and the anhydrides thereof, such as adipic acid, sebacic acid, phthalic acid, trimellitic acid, maleic anhydride, phthalic anhydride, trimellitic anhydride, itaconic anhydride, tetrahydrophthalic anhydride, and pyromellitic anhydride; carboxamides such as an adduct of dimeric acid and triethylene tetramine; methylolated melamines such as methyletherized hexamethylolmelamine; blocked isocyanates such as epsilon-caprolactam blocked isophorone diisocyanate; dicyandiamide and the substituted products thereof such as 2,6-xylenyl biguanide; carboxylic acid dihydrazides such as adipic acid dihydrazide; and imidazoline or imidazole or the salts of these. Of these, the dicyandiamides, carboxylic acid dihydrazides and the imidazoline salts are especially preferred. These curing agents can be used either singly or as a mixture of two or more.

When an epoxy resin substantially insoluble in the liquid medium (c) is used, it is desirable to mold the epoxy resin and a curing agent therefor into a solid powder, and then dipsersing the solid powder in the liquid medium. The epoxy resin-containing solid powder is wetted by the liquid medium (c), but is not swollen or dissolved by the liquid medium (c).

The solid powder containing the epoxy resin may be produced by the same techniques as in the preparation of an ordinary epoxy resin coating powder, for example by a combination of a high temperature roll or extruder and an ordinary pulverizing or assorting means, or by a solvent replacing method.

The particle diameter of the solid powder (b), as in the case of the solid powder (a), is desirably not more than 105 μm, preferably not more than 74 μm, more preferably not more than 44 μm.

When the epoxy resin is soluble in the liquid medium (c), it is advantagesous to use a curing agent which is soluble in the liquid medium (c).

The proportion of the curing agent based on the epoxy resin can be varied over a wide range depending upon the type of the epoxy resin and/or curing agent used. In view of the mechanical properties, water resistance, corrosion resistance required of the coated film, the suitable amount of the curing agent is generally at least 0.6 equivalent, preferably 0.6 to 1.3 equivalents, more preferably 0.8 to 1.2 equivalents, per epoxy group in the epoxy resin to be cured.

If desired, additives such as coloring agents, fillers and flow controlling agents may be incorporated in the epoxy resin. When the epoxy resin is insoluble in the liquid medium (c), these additives are desirably mixed as such with the epoxy resin-containing solid powder. On the other hand, when the epoxy resin is soluble in the liquid medium (c), it is desirable to incorporate the additives in the liquid medium in which the epoxy resin is dissolved. The amount of such additives is not more than 150% by weight, preferably not more than 120% by weight, based on the total amount of the epoxy resin and the curing agent.

Liquid medium (c)

The liquid medium (c) used in the coating composition of this invention is a volatile organic liquid medium which has the ability to wet the solid powder (a) but does not substantially swell or dissolve the solid powder (a). Liquid media which impart good wettability to the surface of the olefinic solid resin include liquids having low polarity or no polarity corresponding to the low polarity or non-polarity of the surface of the olefinic resin. From the standpoint of surface chemistry, it is very desirable for these liquids to have a lower surface energy than the surface energy (generally 31 to 36 mN/m) of the surface of the solid olefinic resin.

The term "substantially incapable of swelling and dissolving the solid powder (a)," as used in the present specification and the appended claims denotes the property of a liquid medium to bring about a state observed under an optical microscope wherein the particles of the solid powder (a) do not agglomerate, nor undergo deformation owing to fusion or swelling. This state refers specifically to a coated film obtained by dispersing 5 g of the solid powder (a) in 50 g of the liquid medium, allowing the dispersion to stand for 7 days at room temperature, and then uniformly coating the dispersion on a glass plate by means of a 200 μm applicator.

Suitable liquid media having low polarity or no polarity include, for example, aliphatic hydrocarbons including alkanes having 5 to 16 carbon atoms such as n-pentane, n-hexane, isohexane, n-heptane, n-octane, isooctane, n-decane, n-dodecane, n-hexadecane and 2,2-dimethylbutane; alkenes having 5 to 16 carbon atoms such as 1-pentene, 1-hexene, 1-heptene, 1-octene, 1-decene, 1-dodecene and 1-hexadecene; alicyclic hydrocarbons having 6 to 12 carbon atoms such as cyclopentane, cyclohexane, methylcyclohexane, dimethylcyclohexane, ethylcyclohexane and methyl isoamyl cyclohexane; aromatic hydrocarbons having 6 to 15 carbon atoms such as benzene, toluene, xylene, mesitylene, ethylbenzene and nonylbenzene; and mixtures of these hydrocarbons such as petroleum ether, petroleum benzine, gasoline, kerosene, petroleum spirit and petroleum naphtha.

In view of the character of these liquid media having low polarity or no polarity, and from thermodyanamic viewpoint, they dissolving epoxy resins with difficulty. These liquid media can therefore be used in preparing a coating composition of the type in which both the solid powder (a) and the epoxy resin-containing solid powder (b) are dispersed without substantial dissolving.

Solvents which substantially dissolve epoxy resins are generally highly polar liquid media. Such highly polar liquid media include, for example, esters such as methyl acetate, ethyl acetate, isopropyl acetate and n-butyl acetate; ketones such as acetone, methyl ethyl ketone, methyl isobutyl ketone and cyclohexanone; ethers such as methyl Cellosolve (ethylene glycol monomethyl ether), ethyl Cellosolve (ethylene glycol monoethyl ether), butyl Cellosolve (ethylene glycol monobutyl ether) and Cellosolve acetate (ethylene glycol monoethyl ether acetate); and halogenated hydrocarbons such as methylene chloride, chloroform and carbon tetrachloride. They are used either singly or as a mixture of two or more.

Many of these solvents for the epoxy resins do not substantially swell and dissolve the solid powder (a). Accordingly, those highly polar solvents which have good ability to wet the solid powder (a) can be used singly as the liquid medium (c). Generally, however, the aforesaid highly polar solvents are used as the liquid medium (c) in admixture with the above liquid media having low polarity or no polarity.

Alcohols have polarity but low surface energy. They have good ability to wet the solid powder (a) but do not substantially dissolve the epoxy resin. Thus, alcohols can be used as the liquid medium (c) for the coating composition of this invention in which the epoxy resin is used without dissolving. When the epoxy resin is used in the dissolved state, these alcohols may be used as auxiliary solvents. Examples of such alcohols include ethyl alcohol, isopropyl alcohol, n-butyl alcohol, n-amyl alcohol, cyclohexanol and diacetone alcohol.

Cellosolve acetate and cyclohexanone can be cited as examples of a single liquid medium which has good ability to wet the solid powder (a) but does not substantially swell and dissolve the solid powder (a) and substantially dissolves the epoxy resin.

Suitable liquid media (c) for the composition of this invention vary depending upon the types of the olefinic resin and epoxy resin used, whether the epoxy resin is used in the dissolved state. However, the following criteria of selection are recommended for the purpose of the invention.

Liquid media (c) which do not substantially swell and dissolve the epoxy resin:

A suitable liquid medium (c) in this case comprises at least 70% by weight, preferably at least 80% by weight, based on the entire liquid media, of an aliphatic or alicyclic hydrocarbon of the above-exemplified types. The use of this liquid medium has been found to further ensure the formation of a multilayer coated film.

Such a liquid medium may further contain up to 10% by weight, preferably up to 5% by weight, of a polar solvent such as esters, ketones, alcohols, glycol ethers, halogenated hydrocarbons, or heterocyclic compounds. This will make it easy to control the viscosity of the resulting coating composition.

Liquid media (c) which substantially swell and dissolve the epoxy resin:

It is desirable to mix at least one of the aforesaid liquid media having low polarity or no polarity and at least one of the aforesaid highly polar liquid media, and select those which meet the following standards (i) and (ii).

(i) The agglomeration of the particles of the solid powder (a) should not be detected when observing with an optical microscope a coated film which is obtained by dispersing 5 g of the solid powder (a) in 50 g of the liquid medium (c), allowing the dispersion to stand at room temperature for 7 days, and coating the dispersion on a glass plate by a 200 μm applicator.

(ii) The undissolved epoxy resin should not be detected when observing with an optical microscope a coated film which is obtained by dissolving 10 g of the epoxy resin in 50 g of the liquid medium (c), allowing the solution to stand at room temperature for 7 days, and coating the solution on a glass plate by a 200 μm applicator.

Furthermore, the liquid medium (c) should have volatility, and generally, it desirably has a boiling point of from 33° to 210° C.

Preparation of the coating composition

The coating composition of this invention can be prepared by dispersing and/or dissolving the solid powder (a) and the resin material (b) in the liquid medium (c). The dispersing or dissolving can be performed by methods known per se, for example by using a homogenizer. Usually, one kind of the solid powder (a) and one kind of the resin material (b) are used. If desired, two or more kinds of the solid powder (a) and/or the resin material (b) may be used.

The ratio of the solid powder (a) to the resin powder (b) is not critical and can be varied over a wide range. Advantageously, the weight ratio of the solid powder (a) to the resin material (b) is from 15:85 to 85:15, preferably from 30:70 to 70:30.

Neither the proportion of the solid powder (a) nor the resin material (b) relative to the liquid medium (c) is critical. It can be varied widely by considering the operability of the coating composition at the time of coating. Generally, it is advantageous to use the liquid medium (c) in an amount of 50 to 300 parts by weight, preferably 80 to 200 parts by weight, more preferably from 100 to 180 parts by weight, per 100 parts by weight of the solid powder (a) and the resin material (b) combined. In order to improve the operability in coating of the coating composition of this invention, a resin component soluble in the liquid medium (c) may also be added. Examples of such resin component are polyvinyl acetate; and ethylene/vinyl acetate copolymer, ethylene/acrylic acid copolymer, sulfonated polyethylene, acrylic acid-grafted polyethylene and acrylamide-grafted polyethylene, all of which have an ethylene content of not more than 70% by weight.

The proportion of the resin component is not more than 5% by weight, preferably not more than 3% by weight, based on the total solids content of the coating composition. If desired, by including not more than 1% by weight of a surface modifying agent such as a surface active agent or a silicone into the coating composition of this invention, it is possible to improve the smoothness of the surface of the coated film and to prevent defects in the coated film such as craters or pinholes.

The coating composition of this invention can be used widely as an anticorrosive coating of various metal substrates such as water supply and drainage pipes, water tanks and underwater structures.

Coating of the coating composition of this invention on such metal substrates does not require any special method, and ordinary methods of coating can be used. For example, there can be used brush coating, spraying, electrostatic coating, roll coating, flow coating and dip coating. The thickness of the coated film is generally at least 10 μm, preferably 10 to 300 μm, more preferably 30 to 200 μm.

The coated film is dried in a customary manner, and then baked. The baking conditions differ depending upon the constituent proportions of the coating composition. Generally, baking can be done satisfactorily at a temperature of from about 100° to about 250° C. for a period of about 5 minutes to about 40 minutes.

The coated film prepared from the slurry-like coating composition of this invention consists of an under layer of the epoxy resin which makes contact with the metal substrate surface and an upper layer of the olefinic resin. The adhesion is very good between the metal substrate surface and the epoxy resin layer and between the epoxy resin layer and the olefinic resin layer. The present invention can afford a strong interlayer adhesion that cannot be achieved with coated films of similar structures formed by conventional two-coat two-baking processes.

The course of forming a multilayer coated film by the slurry-like coating composition of this invention is better understood by referring to the accompanying drawings which show stepwise the states of application of the coating composition and film formation. In FIG. 1, the epoxy resin used is soluble in the liquid medium (c), and in FIG. 2, the epoxy resin is insoluble in the liquid medium (c). In either case, a coating composition 3 supplied from a supply tank 1 is applied to a metal substrate 4 by means of a coating machine 2, and subsequently cured by heating (e.g., at 180° C. for 30 minutes) to form a multilayer coated film 5.

It can be confirmed by various methods that when a coated film is formed from the slurry-like coating composition of this invention, two layers are completely formed. For example, the presence of two layers with a clear boundary can be confirmed by including a colored pigment into one of the solid powder (a) and the resin material (b), or including pigments of clearly different colors into both of these components, and microscopically observing the resulting coated film. Alternatively, the coated film is totally peeled off from the metal substrate surface, and the infrared absorption spectra of the two surfaces of the removed coated film are measured by a reflective method. On the metal substrate surface, an infrared spectrum corresponding to an almost pure epoxy resin cured product is observed, and on the gaseous phase (surface layer) side, an infrared spectrum corresponding exactly with or almost to the polyolefin resin before blending can be observed. Or by measuring the angles of contact of both surfaces of the peeled film with water and paraffin are measured. By using the obtained results, the surface energy of each surface is calculated in accordance with Young's equation and Fowkes equation. From this, it can be confirmed that the surface energies of the surface layer and the metal substrate side completely agree with those of pure olefinic resin and pure epoxy resin cured article. For example, in Example 1 given hereinbelow, the surface energies of the two surfaces were 31.2 mN/m and 42.0 mN/m respectively, which show complete correspondence with those of pure materials.

Thus, the coating composition of this invention can afford a coated film having superior corrosion resistance, water resistance and water pollution resistance and high mechanical strength.

When a coating composition of the type having the epoxy resin dissolved therein is applied to the surface of a metal substrate, the wettability of the metal substrate surface with the epoxy resin component is already complete immediately after the coating. For this reason, a layer of the epoxy resin component is very easy, and the formation of a multilayer film also proceeds easily. The operability of the coating composition is superior because the viscosity of the coating composition can be very easily controlled by properly selecting the liquid medium. On the other hand, when a coating composition of the type in which the epoxy resin is dissolved as an insoluble solid powder is applied, the particles of the solid powder are separated from each other by a layer of a poor solvent and do not make direct contact, and therefore, no problem of blocking arises. In the course of forming a coated film, the particles move easily and assumes the most closely packed structure with the volatilization of the volatilizable organic poor solvent. Accordingly, even a thin layer, for example a coated film having a thickness of 10 to 40 μm, has the advantage of becoming a completely smooth coated film having continuity after baking.

The following Examples illustrate the present invention in more detail. All percentages and parts in these examples are by weight.

EXAMPLE 1

A slurry-like coating composition was prepared by dispersing 45 parts of low-density polyethylene powder (FLO-THENE UF-15, a product of Seitetsu Kagaku Kogyo K.K.) having a melt index of 1.5 g/10 min. and an average particle diameter of 25 μm, 55 parts of a thermosetting epoxy resin powder having an average particle diameter of 30 μm containing bisphenol A-type epoxy resin (Epikote #1004, a product of Shell Chemical Co.) havng a number average molecular weight of 1400 and an epoxy equivalent of 900 and adipic acid dihydrazide in a weight ratio of 100:5.5 in 150 parts of a mixed poor solvent composed of iso-octane and n-decane in a weight ratio of 80:20. The coating composition was electrostatically spray-coated on a mild steel plate treated with zinc phosphate, and cured at 200° C. for 20 minutes to afford a smooth coated film having a thickness of about 45 μm. The gaseous phase side and the metal substrate side of the coated film were shaved respectively to a depth of about 5 μm, and subjected to infrared spectroscopy. It was confirmed that the resulting coated film was a multilayer film consisting of a layer of polyethylene on the vapor phase side and a layer of cured epoxy resin on the metal substrate side in an almost discrete state. The properties of the coated film was tested by the following three testing methods.

(1) Adhesion strength in water

Crosscuts (100 per cm²) were provided on the coated film, and the film was dipped in warm water at 40° C. for 800 hours. The film was subjected to a peel test by using a Cellophane adhesive tape. The number of squares which were not peeled off between layers or between the film and the substrate surface was counted, and expressed per 100.

(2) Corrosion resistance

Scratches were provided in the coated film, and a 5% aqueous solution of sodium chloride was sprayed onto the coated film by means of a salt spray tester. After a lapse of 1000 hours, the width (mm) of a corroded part from the cut was determined.

(3) Resistance to water pollution

Determined in accordance with JWWA K-115-1974. The film is rated "acceptable" if the amount of chlorine consumed (ppm) is 0.7 or less.

The results of the tests on the coated film obtained in Example 1 were as follows. For comparison, a coated film of the same polyethylene as used in the above Example (45 μm thick) and a coated film of the same epoxy resin as used in the above Example were also subjected to the same tests, and the results are shown below.

| Sample | Adhesion strength in water | Corrosion resistance (mm) | Resistance to water pollution (ppm) |
|---|---|---|---|
| Multilayer film (invention) | 98/100 | 1.0 | 0.15 |
| Polyethylene film (comparison) | 15/100 | 5.5 | 0.1 |
| Epoxy resin film (comparison) | 100/100 | 0.8 | 1.0 |

EXAMPLE 2

A slurry-like coating composition was prepared by dispersing 30 parts of a propylene/acrylic acid copolymer powder (FLO-DEX P-2; propylene unit about 94%; a product of Seitetsu Kagaku Kogyo Kabushiki Kaisha) having a melt index of 20 g/10 min. and an average particle diameter of 40 μm, 30 parts of a solution of 3 parts of an ethylene/vinyl acetate copolymer (EV-40, a product of Mitsui Polychemical Co., Ltd.; ethylene unit content 60%) in 27 parts of iso-octane, and 67 parts of a thermosetting epoxy resin composition powder having an average particle diameter of 35 μm composed of a bisphenol A-type epoxy resin (Epikote #1009, a product of Shell Chemical Co.) having a number average molecular weight of 3750 and an epoxy equivalent of 2850, dicyandiamide, rutile titanium dioxide and red iron oxide in a weight ratio of 100:4.5:30:20 in 120 parts of a mixed poor solvents composed of 2,2-dimethylbutane, isooctane, methylisobutyl ketone and kerosene in a weight ratio of 35:50:7:8. The resulting coating composition was electrostatically spray-coated on a mild steel plate treated with zinc phosphate, and cured at 220° C. for 15 minutes to form a coated film having a thickness of 125 μm. When the cross section of the coated film was observed with a microscope, it was confirmed that a clear propylene copolymer layer existed on the gaseous phase side, and a colored cured epoxy resin layer on the substrate surface side. The coated film was tested in the same way as in Example 1. The results were as follows:

Adhesion strength in water: 100/100
Corrosion resistance: 1.2 mm
Resistance to water pollution: 0.2 ppm

EXAMPLE 3

A slurry-like coating composition was prepared by dispersing 50 parts of a powder having a particle diameter distributed from 5 to 15 μm obtained by chemically pulverizing an ethylene/vinyl acetate copolymer (Evaflex #360; ethylene unit content 75%; a product of Mitsui Polychemical Co., Ltd.) having a melt index of 2 g/10 min., 10 parts of the same low-density polyethylene powder as used in Example 1, and 40 parts of a powder of a thermosetting epoxy resin composition having an average particle diameter of 20 μm and composed of bisphenol-type epoxy resin (Epikote #1002, a product of Shell Chemical Co.) having a number average molecular weight of 1000 and an epoxy equivalent of 650, flexible dimeric acid-base epoxy resin (Epikote 190 872, a product of Shell Chemical Co.) having an epoxy equivalent of 650, and hexamethylolmelamine-type curing agent (PX-2000, a product of Sanwa Chemical Co.) in a weight ratio of 80:20:30 in 180 parts of n-octane. The resulting coating composition was air sprayed on a mild steel plate treated with iron phosphate, and cured at 210° C. for 15 minutes to afford a smooth coated film having a thickness of about 25 μm. When the gaseous phase-side and the substrate surface-side of the coated film were analyzed by total reflective type IR spectra, it was confirmed that these layers were composed of almost pure ethylene/vinyl copolymer resin and the cured epoxy resin respectively. The resulting multilayer coated film was tested in the same way as in Example 1. The results are as follows:

Adhesion strength in water: 100/100
Corrosion resistance: 1.5 mm
Resistance to water polution: 0.55 ppm

EXAMPLE 4

A slurry-like coating composition was prepared by dispersing 30 parts of low-density polyethylene powder (FLO-THENE UF-80, a product of Seitetsu Kagaku Kogyo K.K.) having a melt index of 80 g/10 min. and an intermediate particle diameter of 15 μm, 20 parts of high-density polyethylene powder (FLO-THENE UF-SPD, a product of Seitetsu Kagaku Kogyo K.K.) having a melt index of 1 g/10 min. and an intermediate particle diameter of 15 μm and 50 parts of a powder of a thermosetting epoxy resin composition having an average particle diameter of 25 μm and composed of Epikote #1004, phenol-novolak type epoxy resin (Epikote #152, a product of Shell Chemical Co.) having an epoxy equivalent of 175, 2,6-xylenyl biguanide and an iron oxide type rust-preventive pigment (Rustack 450, a product of Toda Kogyo K.K.) in a weight ratio of 70:30:5:20 in 120 parts of a mixed poor solvent composed of isohexane and isooctane in a mixing weight ratio of 50:50. The coating composition obtained was coated on a mild steel plate whose surface had been cleansed with trichloroethylene. It was cured at 170° C. for 30 minutes to afford a coated film having a thickness of about 35 μm. The coated film was tested in the same way as in Example 1, and the results were as follows:
Adhesion strength in water: 95/100
Corrosion resistance: 0.8 mm
Resistance to water pollution: 0.25 ppm

EXAMPLE 5

A slurry-like coating composition was prepared by dispersing 30 parts of medium-density polyethylene (FLO-THENE M-13109) having a melt index of 4 g/10 min. and a maximum particle diameter of 74 μm, 30 parts of styrenated polyethylene powder obtained by grafting styrene in an amount of about 10% to polyethylene by ultraviolet irradiation, and 40 parts of a powder of a thermosetting epoxy resin composition having a maximum particle diameter of 44 μm composed of bisphenol-type epoxy resin (Epikote #1007, a product of Shell Chemical Co.) having a number average molecular weight of 2900 and an epoxy equivalent of 1780 and trimellitic anhydride in a weight ratio of 100:6 in 100 parts of a mixed poor solvent composed of n-heptane and methylcyclohexane in a weight ratio of 60:40. The resulting coating composition was electrostatically sprayed on a mild steel plate to which a primer had been formed from a cationic electro-deposition paint (ED 190 9000, a product of Kansai Paint Co. Ltd.). The coating was cured at 200° C. for 25 minutes to afford a coated film having a thickness of about 200 μm. The coated film was tested in the same way as in Example 1, and the results were as follows:
Adhesion strength in water: 98/100
Corrosion resistance: 1.0 mm
Resistance to water pollution: 0.4 ppm

EXAMPLE 6

A coating composition was prepared by dispersing and dissolving 35 parts of low-density polyethylene powder (FLO-THENE UF-80, a product of Seitetsu Kagaku Kogyo K.K.) having a melt index of 80 g/10 min. and a medium particle diameter of 15 μm, 60 parts of Epikote #828 (a product of Shell Chemical Co.; molecular weight 380; epoxy equivalent 190), and 5 parts of 2,6-xylenyl biguanide in 120 parts of a solvent composed of methyl isobutyl ketone, isooctane and toluene in a weight ratio of 45:15:40. The resulting coating composition was coated on a mild steel plate treated with zinc phosphate, and cured at 170° C. for 30 minutes to afford a coated film having a thickness of about 70 μm. The gaseous phase-side and the metal substrate surface side of the coated film were shaved to a depth of about 5 μm, and analyzed by IR spectroscopy. It was confirmed that the coated film consisted of polyethylene on the gaseous phase side and the epoxy resin on the substrate surface side as two almost completely separate layers. The properties of the coated film were tested by the same method as in Example 1. The results are shown below. For comparison, the same tests were performed on a coated film (70 μm thick) of the same polyethylene as used above and a coated film (70 μm thick) of the same epoxy resin as used above. The results are also shown in the following table.

| Sample | Adhesion strength in water | Corrosion resistance (mm) | Resistance to water pollution (ppm) |
| --- | --- | --- | --- |
| Multilayer film (invention) | 100/100 | 0.8 | 0.2 |
| Polyethylene film (comparison) | 23/100 | 5.0 | 0.1 |
| Epoxy film (comparison) | 100/100 | 0.8 | 1.1 |

EXAMPLE 7

A coating composition was prepared by dispersing and dissolving 40 parts of low-density polyethylene powder (FLO-THENE UF-1.5, a product of Seitetsu Kagaku K.K.) having a melt index of 1.5 g/10 min. and an average particle diameter of 25 μm, 5 parts of an ethylene/acrylic acid copolymer powder (FLO-DEX E-4, an ethylene content about 90% by weight, a product of Seitetsu Kagaku Kogyo K.K.) having a melt index of 20 g/10 min. and an average particle diameter of 25 μm, 40 parts of bisphenol A-type epoxy resin (Epikote #1001, a product of Shell Chemical Co.) having a number average molecular weight of 900 and an epoxy equivalent of 475, 15 parts of a hexamethylolmelamine type curing agent (PX-2000, a product of Sanwa Chemical Co. Ltd.), and 10 parts of iron oxide (Bengara KNO, a product of Toda Kogyo K.K.) in 150 parts of a mixed solvent composed of isobutyl acetate, cyclohexanone and methylcyclohexane in a weight ratio of 50:20:30. The resulting coating composition was coated on a polished steel plate, and cured at 200° C. for 25 minutes to afford a coated film having a thickness of about 150 μm. The cross section of this coated film was observed with a microscope. It was confirmed that a clear polyethylene layer was formed on the gaseous phase side, and an epoxy resin layer having the color of iron oxide, on the substrate side. The multilayer coated film was tested in the same way as in Example 1, and the results were as follows:
Adhesion strength in water: 100/100
Corrosion resistance: 1.0 mm
Resistance to water pollution: 0.3 ppm

EXAMPLE 8

A coating composition was prepared by dispersing and dissolving 60 parts of a powder having a particle diameter distributed from 5 to 15 μm obtained by chemically pulverizing an ethylene/vinyl acetate copolymer (Evaflex #450, ethylene content 81% by weight; a product of Mitsui Polychemical Co., Ltd.) having a melt index of 15 g/10 min., 37.5 parts of a phenol novolac-type epoxy resin (Epikote #152, a product of Shell Chemical Co.) having a number average molecular weight of 350 and an epoxy equivalent of 175, 2.5 parts of modified dicyandiamide (Hardener HT2844, a product of Ciba-Geigey) and 10 parts of a rust-preventive agent (Rustock 450, a product of Toda Kogyo K.K.) in 120 parts of a mixed solvent composed of methyl Cellosolve acetate, cyclohexanone, isopropyl alcohol and cyclohexane in a weight ratio of 25:25:15:35. The coating composition was coated on an anodically oxidized aluminum plate which had been subjected to sealing treatment, and heated at 180° C. for 30 minutes to afford a smooth coated film having a thickness of about 45 μm.

The formation of a complete multilayer film was confirmed by the same method as in Example 7. The coated film was tested in the same way as in Example 1, and the following results were obtained.

Adhesion strength in water: 98/100
Corrosion resistance: 0.8 mm
Resistance to water pollution: 0.35 ppm

What we claim is:

1. A coating composition capable of forming a multilayer coated film, said composition consisting essentially of:
   (a) a solid power comprising an olefinic resin containing at least 76% by weight of a structural unit derived from an olefin and having a melt index of from 0.3 to 120 g/10 min.,
   (b) a film-forming resin material containing an epoxy resin having a number average molecular weight of about 300 to about 4,000 and an epoxy equivalent of from 100 to 3,300, and
   (c) a volatile organic liquid medium capable of wetting said powder (a) but substantially incapable of swelling and dissolving said solid powder (a),
   wherein the weight ratio of said solid powder (a) to said film-forming resin mateial (b) is from 15:85 to 85:15,
   wherein the amount of said liquid medium (c) is 80 to 300 parts by weight per 100 parts by weight of said solid powder (a) and said film-forming resin material (b) combined, and
   said liquid medium being either
   (1) a liquid medium at least 70% by weight of which consists of a $C_{5-16}$ aliphatic hydrocarbon, a $C_{6-12}$ alicyclic hydrocarbon or both;
   (2) a mixed liquid medium consisting of at least one liquid medium having low polarity or no polarity selected from $C_{5-16}$ aliphatic hydrocarbons, $C_{6-12}$ alicyclic hydrocarbons, $C_{6-15}$ aromatic hydrocarbons, and mixtures of these and at least one highly polar liquid medium selected from esters, ketones, ethers and halogenated hydrocarbons, said mixed liquid medium satisfying the following conditions (i) and (ii):
      (i) the agglomeration of the particles of the solid powder (a) should not be detectable when observing, with an optical microscope, a coated film which is obtained by dispersing 5 g of the solid powder (a) in 50 g of the liquid medium (c), allowing the dispersion to stand at room temperature for 7 days, and coating the dispersion on a glass plate by a 200 μm applicator;
      (ii) the undissolved epoxy resin should not be detectable when observing, with an optical microscope, a coated film which is obtained by dissolving 10 g of the epoxy resin in 50 g of the liquid medium (c), allowing the solution to stand at room temperature for 7 days, and coating the solution on a glass plate by a 200 μm applicator; or
      (3) cellosolve acetate, cyclohexanone, or both,
      said composition further containing curing agent for component (b).

2. The composition of claim 1 wherein said olefinic resin contains at least 85% by weight of a structural unit derived from an olefin.

3. The composition of claim 1 wherein said olefinic resin has a melt index in the range of from 1.5 to 80 g/10 min.

4. The composition of claim 1 wherein said olefinic resin is selected from the group consisting of low-density polyethylene, medium-density polyethylene, high-density polyethylene, polypropylene, an ethylene/propylene copolymer, an ethylene/vinyl acetate copolymer, an ethylene/acrylic acid copolymer, fluorinated polyethylene, chlorinated polyethylene, chlorosulfonated polyethylene, sulfonated polyethylene, polyethylene oxidized with ozone, styrene-grafted polyethylene, acrylic acid-grafted polyethylene, acrylonitrile-grafted polyethylene and acrylamide-grafted polyethylene.

5. The composition of claim 4 wherein said olefinic resin is low-density polyethylene, medium-density polyethylene or an ethylene/vinyl acetate copolymer.

6. The composition of claim 1 wherein said solid powder (a) contains up to 150% by weight, based on the weight of the olefinic resin, a coloring agent and/or a filler.

7. The composition of claim 1 wherein said solid powder (a) has an average particle diameter of not more than 105 microns.

8. The composition of claim 1 wherein said epoxy resin has an average molecular weight of about 500 to about 2,900.

9. The composition of claim 1 wherein said epoxy resin has an epoxy equivalent in the range of 450 to 2100.

10. The composition of claim 1 wherein said epoxy resin is selected from the group consisting of polyphenol/epihalohydrin condensate-type epoxy resins, phenol/formaldehyde condensate-type epoxy resins and polymerized fatty acid-type epoxy resins.

11. The composition of claim 10 wherein said epoxy resin is a polyphenol/epihalohydrin condensate-type epoxy resin.

12. The composition of claim 1 wherein said film-forming resin material is in the form of a solid powder which is wetted by said liquid medium (c) but is not swollen and dissolved by said liquid medium (c).

13. The composition of claim 1 wherein said epoxy resin is substantially dissolved in said liquid medium (c).

14. The composition of claim 12 wherein said liquid medium is an organic liquid having low polarity or no polarity, particularly a hydrocarbon.

15. The composition of claim 1 wherein said liquid medium (c) is a mixture of an inert organic liquid having low polarity or no polarity and an inert polar organic liquid capable of substantially dissolving said epoxy resin.

16. A method for for forming a multilayer coated film on the surface of a metal substrate by a one coat-one bake technique, which comprises coating the coating composition according to any one of claims 1 to 11 and 12 to 15 on the surface of said metal substrate, and baking the coating at a temperature of about 100° to about 250° C., whereby said multilayer film is substantially formed during said baking.

* * * * *